United States Patent [19]

McLaughlin et al.

[11] Patent Number: 5,239,404

[45] Date of Patent: Aug. 24, 1993

[54] LARGE ANGLE REFLECTIVE SCANNING SYSTEM AND METHOD

[75] Inventors: Joseph L. McLaughlin, Salem, Mass.; Paul Jarmuz, Hudson, N.H.

[73] Assignee: Litton Systems, Inc., Lexington, Mass.

[21] Appl. No.: 940,467

[22] Filed: Sep. 4, 1992

[51] Int. Cl.⁵ .......................... G02B 26/08; G02B 5/08
[52] U.S. Cl. .................................. 359/226; 359/861; 359/900
[58] Field of Search ................ 359/196, 226, 365, 555, 359/556, 861, 862, 900, 399, 419, 423, 434

[56] References Cited

U.S. PATENT DOCUMENTS

| | | | |
|---|---|---|---|
| 4,101,195 | 7/1978 | Korsch | 350/55 |
| 4,406,525 | 9/1983 | Itoh et al. | 359/226 |
| 5,144,496 | 9/1992 | Kashima | 359/861 |

OTHER PUBLICATIONS

M. Tarenghi et al., "The ESO NTT (New Technology Telescope): The first active optics telescope," *SPIE* vol. 1114 Active Telescope Systems Mar. 1989, pp. 302–313.

*Primary Examiner*—Bruce Y. Arnold
*Assistant Examiner*—James Phan
*Attorney, Agent, or Firm*—Michael H. Wallach; Robert F. Rotella

[57] ABSTRACT

A system and method for optically scanning a scene are disclosed. The system is rotated about a pitch axis and a roll axis to provide the desired scanning capability. The system consists of a primary mirror, a secondary mirror, a tertiary mirror and a fold mirror. The fold mirror is located between the primary and secondary mirrors and reflects the light from the field of view along the pitch axis of the system. The light is reflected by a series of plane fold mirrors to the roll axis and out through an exit aperture. Because the light is reflected along the pitch axis and roll axis, the system can be rotated about these axes while the optical output is maintained as required. Rotation about these axes through internal points between the primary and secondary mirrors minimizes the volume swept out by the system during rotation and maximizes the angles through which the system can be rotated.

18 Claims, 4 Drawing Sheets

LARGE ANGLE REFLECTIVE SCANNING SYSTEM AND METHOD

BACKGROUND OF THE INVENTION

A typical telescopic system collects light through an entrance aperture, passes the light through reflective optics and onto a plane for viewing. The light impinges upon a primary mirror and is reflected toward a secondary mirror. The light can then be reflected from the secondary mirror toward a focus and extends through an aperture in the primary mirror to a series of mirrors aft of the primary mirror. The light can be reflected by these mirrors out of the system to a camera or detector.

It is often desirable to scan such a system across a wide field of view for pointing or scanning in a raster or rectilinear method. When scanning, the output image must be directed onto the detector to allow for continuous viewing, recording or analysis. To that end, the entire system, including the mirrors aft of the primary mirror and the detector, rotates as a unit. As the entire system rotates, a large volume is necessary to permit rotation. This can limit the usefulness of the system in the confined enclosures of some airborn and space applications. Also, mechanical and/or optical interference inherent in such systems limit the angular range through which the system can be rotated.

A continuing need exists however for a more compact scanning system that provides accurate imaging at long focal lengths and over a broad range of wavelengths.

SUMMARY OF THE INVENTION

The present invention is an scanning optical system and a method of imaging objects at long focal lengths. Light enters the system through an entrance aperture and follows an optical path through the system. The light exits the system through an exit aperture. The system is rotatable about a pitch axis and a roll axis. A primary mirror receives the light entering the system and reflects it toward a secondary mirror. The secondary mirror receives the light from the primary mirror and reflects it toward a focus between the primary mirror and the secondary mirror. A tertiary mirror also reflects light along the optical path. A fold mirror is located between the primary and secondary mirrors. The fold mirror reflects the light along the pitch axis and couples the light to the exit aperture. The system also includes a pitch actuator and a roll actuator for rotating the system about the pitch axis and the roll axis, respectively.

In one embodiment of the invention, the tertiary mirror is located behind or aft of the primary mirror. In that embodiment, the system optical axis runs through the primary, secondary, tertiary, and fold mirrors as well as the focus. Light reflected from the secondary mirror passes through an aperture in the fold mirror and then through an aperture in the primary mirror to the tertiary mirror. The light is reflected back to the fold mirror where it is reflected along the pitch axis. In another embodiment, the tertiary mirror is located along the pitch axis. In this embodiment, the light from the secondary mirror is reflected along the pitch axis by the fold mirror toward the tertiary mirror. The tertiary mirror reflects the light back along the pitch axis past the fold mirror.

In one embodiment, the pitch axis runs through a point approximately at the geometric center of a volume occupied by the system. In another embodiment, the pitch axis and the roll axis intersect at a point approximately at the geometric center of the system volume. In another embodiment, the fold mirror is located at a point approximately at the geometric center of the volume at the intersection of the pitch axis and the roll axis. In another embodiment, the roll axis runs through the exit aperture of the system.

The scanning system of the present invention provides distinct advantages over prior scanning systems. Reflecting the light along the pitch axis between the primary and secondary mirrors allows the system to be rotated about the pitch axis. Because the system is rotated about an axis through the interior of the system, it sweeps out a much smaller volume when it is rotated as compared to prior systems. In addition, the locations of the pitch axis and the roll axis eliminate mechanical and optical interference from other system components. The angular range of rotation of the present invention is much larger than that of prior systems. Also, the system is purely reflective. Because no refractive components are included, maximum spectral performance is achieved.

The scanning system of the present invention also has a longer focal length than typical dual mirror Cassegrain systems of the prior art. The tertiary mirror of the present invention provides the extended focal length. The system also has a wider field of view that prior art systems and a flat image field. These also are provided by the tertiary mirror. The flat image field eliminates the need in prior systems for additional optical equipment to flatten the image. Thus, detection devices such as cameras are much more easily applicable to the present invention than to the prior art systems. Some prior optical systems have achieved some of these benefits with the use of refractive optics, with the resulting loss of spectral range. However, in the present invention, they are achieved with reflective optics, thereby maintaining the wide spectral range of the system.

The physical configuration of the present invention provides the present invention with an accessible exit pupil. The accessible exit pupil provides certain advantages. Optical devices such as baffling devices and analgesic wavefront correction devices can be coupled to the exit pupil to correct the optical output. Also, because the fold mirror is located at or close to the focus between the primary and secondary mirrors, it can be small in size. This small size reduces blockage or vignetting of the image.

The system of the present invention can be incorporated into aircraft and satellites to image and record objects at large focal lengths on or adjacent the earth's surface. These embodiments are referred to generally as aerial imaging for the purpose of this application.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
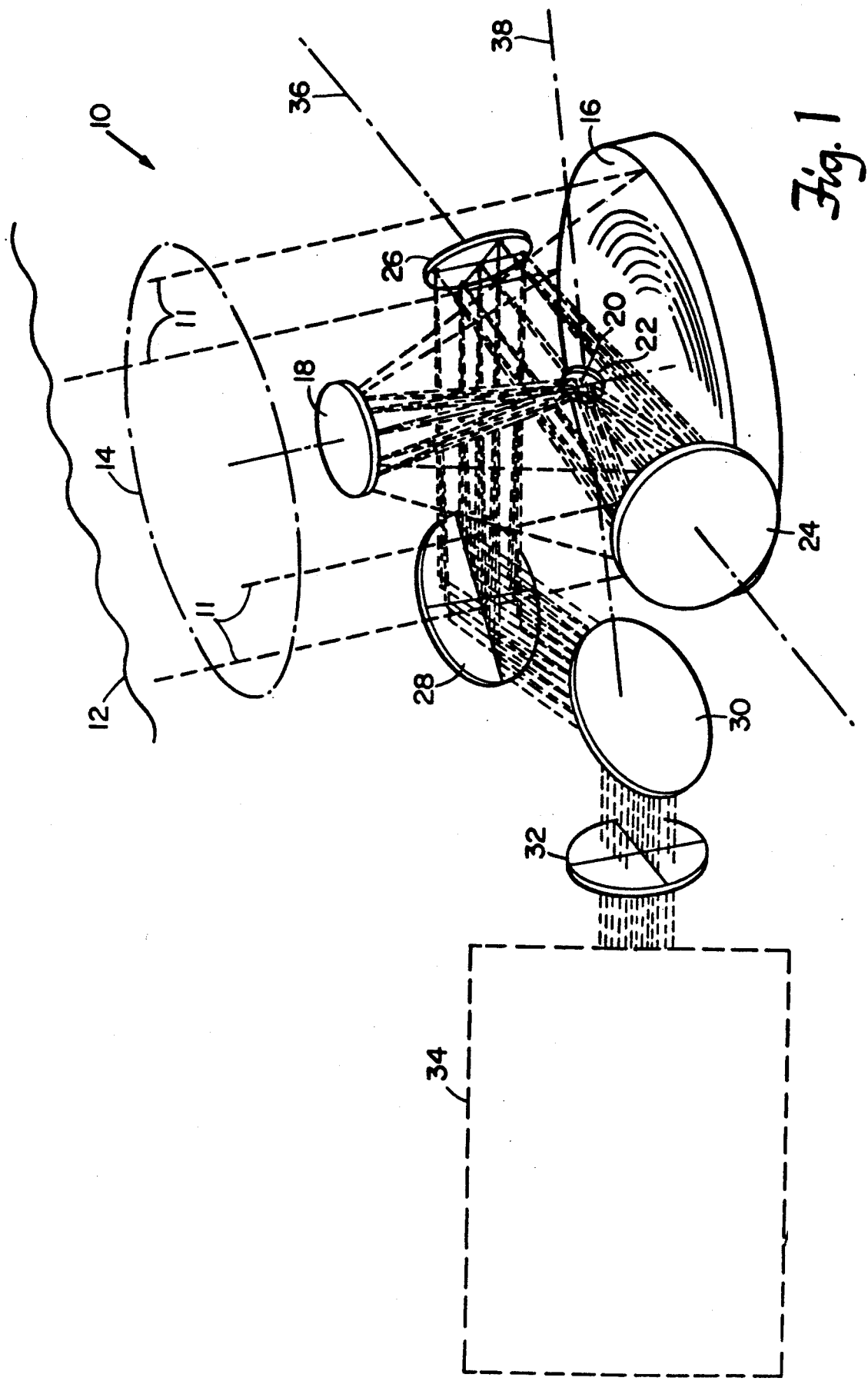
FIG. 1 is a schematic perspective view of a preferred embodiment of the invention.

FIG. 1 is a perspective view of a preferred embodiment of the reflective scanning system 10 of the present invention. Light 11 from scene 12 enters the system 10 through entrance aperture 14. The light impinges on primary mirror 16 and is reflected to secondary mirror 18. Both primary mirror 16 and secondary mirror 18 are curved to direct the light from the secondary mirror 18 toward a focus located at point 20. A fold mirror 22 reflects the light toward a tertiary mirror 24. The tertiary mirror 24 reflects the light along an axis back toward the first of three plane fold mirrors 26, 28, 30. The light is reflected by the three plane mirrors 26, 28, 30 in succession along a path to an exit aperture 32. The light leaves the device 10 through the exit aperture 32 and is detected by optical detection apparatus 34.

The system 10 is rotatable about a pitch axis 36 and a roll axis 38. When scanning a scene 12, rotation about both of these axes 36, 38 is simultaneously controlled by a system shown in greater detail in FIG. 3 that points the system in the desired direction.

The light from secondary mirror 18 is reflected by the fold mirror 22 along the pitch axis 36 toward tertiary mirror 24. Tertiary mirror 24 reflects the light back along the pitch axis 36 to the plane fold mirror 26.

When the system 10 is rotated about the pitch axis 36, mirrors 16, 18 and 22 rotate as a unit in a fixed relation to each other. Mirrors 24, 26, 28 and 30 remain stationary with respect to mirrors 16, 18 and 22. Thus, the light leaving third mirror 22 will continue to impinge on tertiary mirror 24 and will be directed by mirrors 26, 28, 30 to exit aperture 32 and on to detection apparatus 34. When the system 10 is rotated about the roll axis 38, all of the mirrors 16, 18, 22, 24, 26, 28 and 30 rotate as a unit in fixed relation to each other. As a result, regardless of the orientation of the system about the roll axis 38, light is directed through the system 10 to the exit aperture 32.

Figure 2:
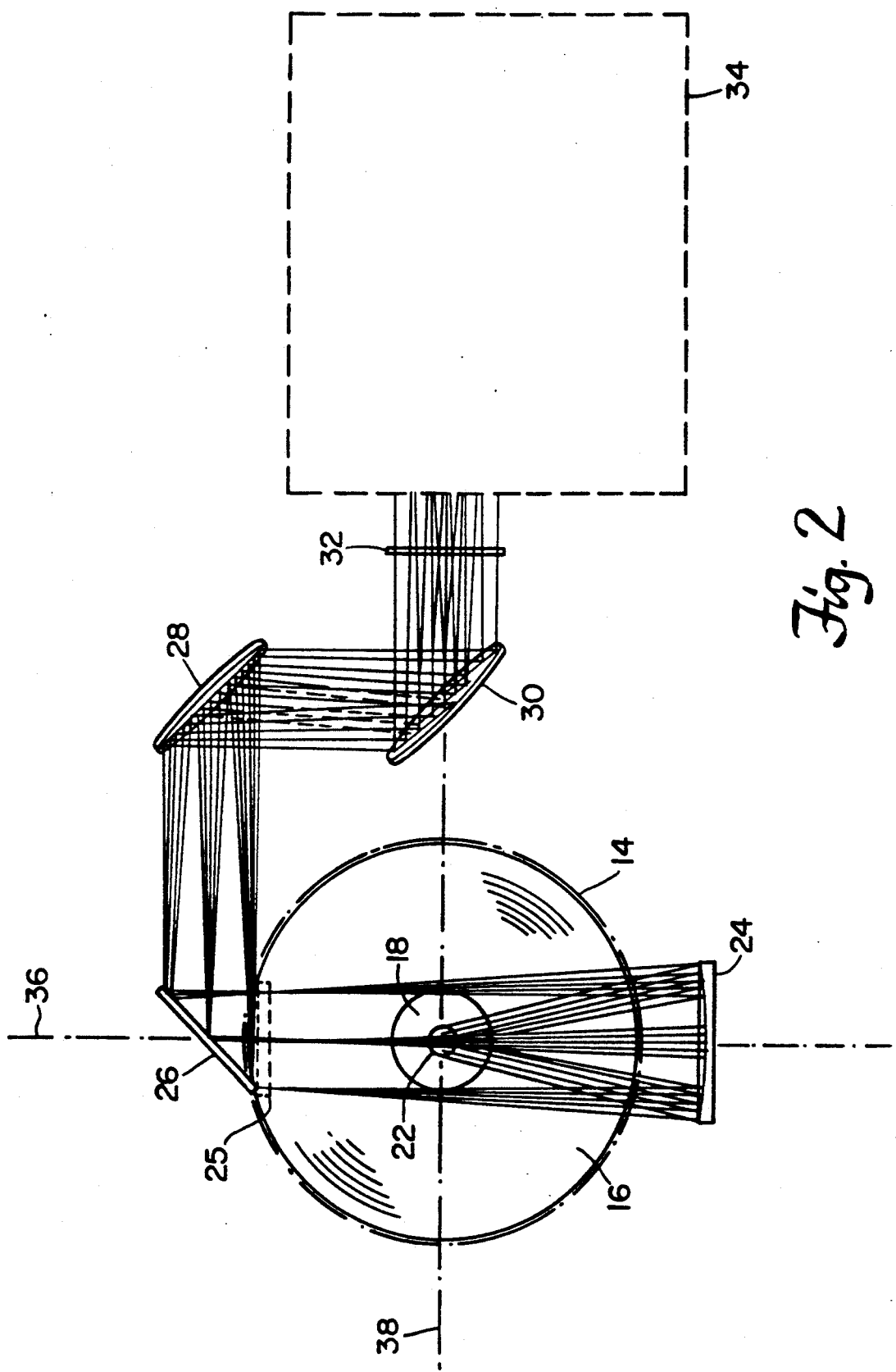
FIG. 2 is a top view of the embodiment of FIG. 1.

FIG. 2 is a top view of the embodiment of FIG. 1 looking into the entrance aperture 14. In the Figure it can be seen that the light is reflected by mirror 22 along the pitch axis 36 to tertiary mirror 24. From the tertiary mirror 24, the light is reflected to plane mirror 26 then to mirrors 28 and 30 and out through the exit aperture 32 along the roll axis 38 to detection apparatus 34. The tertiary mirror 24 performs the multiple function of providing long focal length and flat extended field of view over a broad spectral range.

Figure 3:
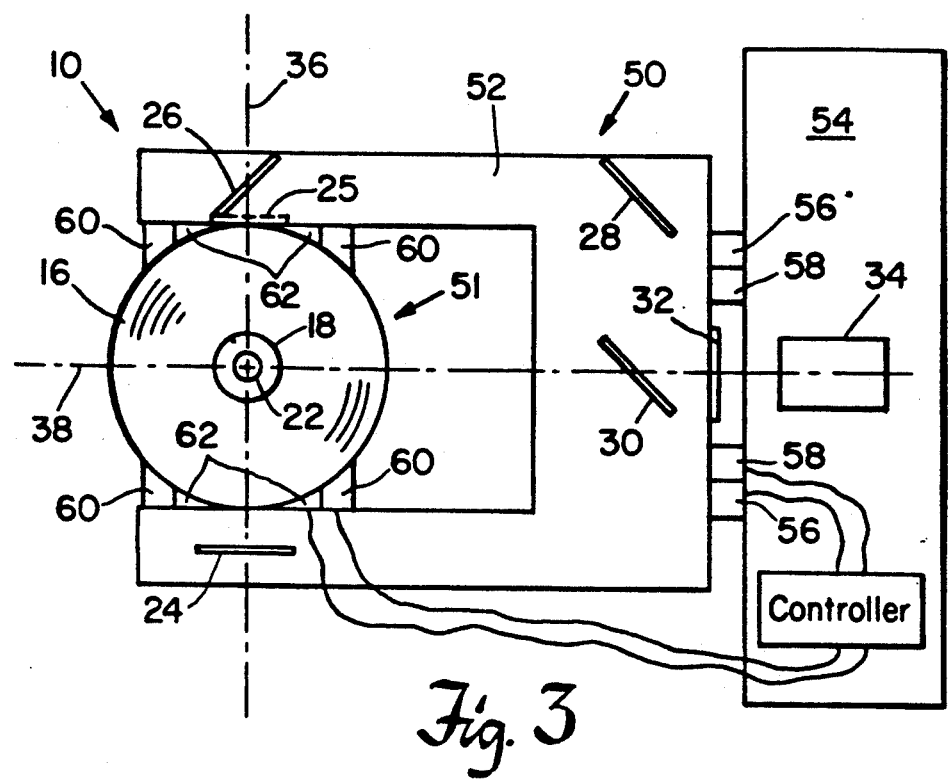
FIG. 3 is a schematic representation of the mounting and rotating apparatus of the present invention.

FIG. 3 is a schematic depiction of the mechanical configuration of the reflective scanning system embodiment of FIGS. 1 and 2. The system 10 is mounted to a dual-axis rotation system 50. Yoke 52 of the system 50 is mounted to driving base 54 via bearings 56. The driving base 54 includes a controller that controls the rotation of the yoke 52 about the roll axis 38. Encoders 58 sense the rotation and provide feedback to the driving base 54.

Primary mirror 16, secondary mirror 18, fold mirror 22, and tertiary mirror 24 are mounted as a unit 51 to yoke 52 of the dual axis system 50 via bearings 60. The mirrors 16, 18, 22, and 24 are held together by well-known bridge and truss members (not shown) used for supporting optical systems. The driving yoke 52 is coupled to the mirror unit 51 to rotate the unit 51 about pitch axis 36. Encoders 62 sense the rotation and provide feedback to the driving yoke 52.

Mirrors 26, 28, and 30 are mounted to yoke 52. Thus, it can be seen that when pitch axis rotation is initiated, only mirrors 16, 18, 22, and 24 rotate as a unit, and mirrors 26, 28, and 30 remain stationary on the yoke 52. However, when roll axis rotation is initiated, all of the mirrors rotate together. Under both rotational conditions, the light entering the system 10 is directed out of the system through exit aperture 32 along roll axis 38 to detection apparatus 34 in fixed relation with the driving base 54.

Figure 4:
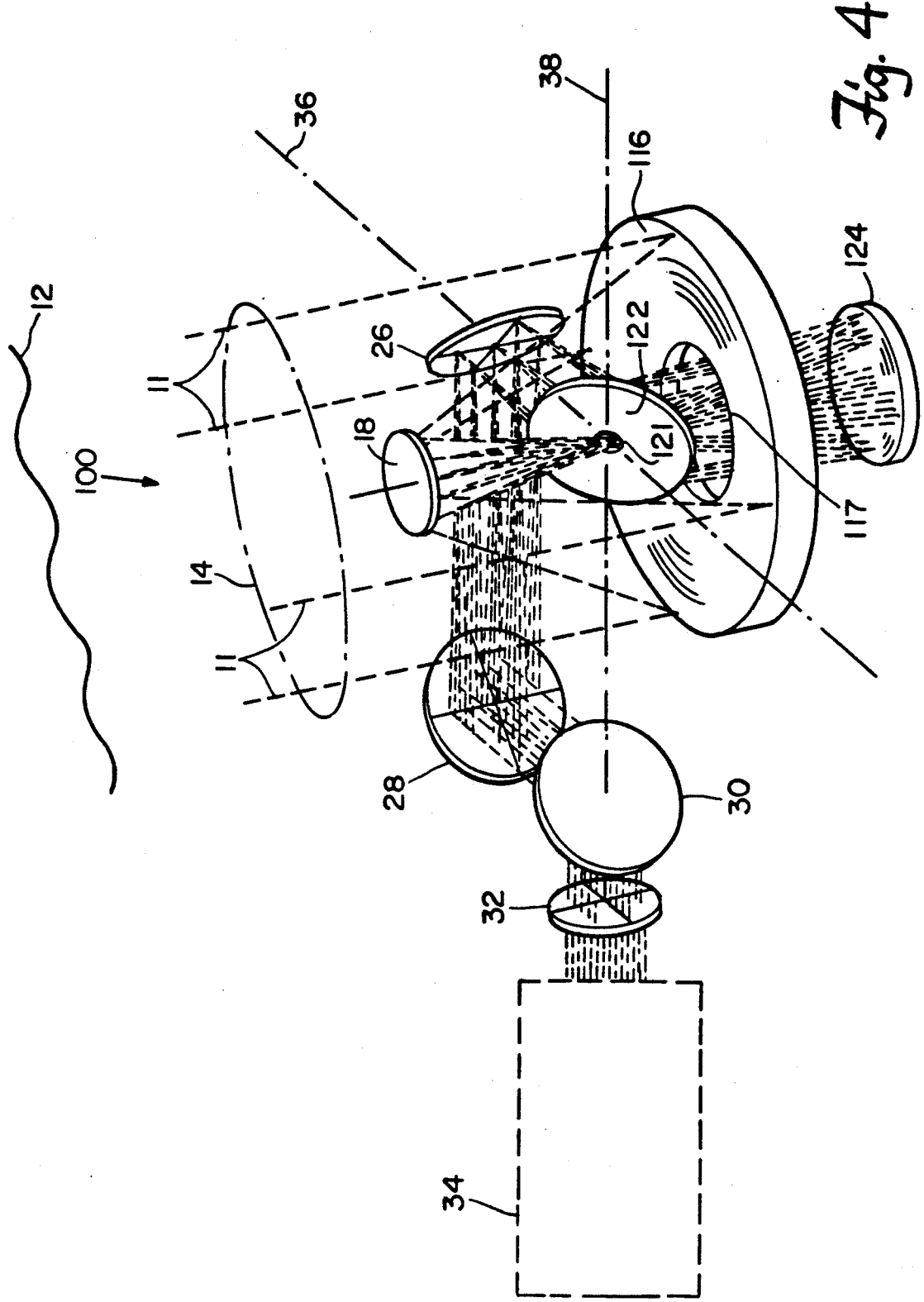
FIG. 4 is a perspective view of the mirror arrangement of another preferred embodiment of the present invention.

FIG. 4 depicts the mirror arrangement of another embodiment of the reflective scanning system of the present invention. In this embodiment, light 11 enters the system 100 through entrance aperture 14 and impinges on primary mirror 116. The light is then reflected to secondary mirror 18. From the secondary mirror 18, the light travels back toward a focus between the primary 116 and secondary 18 mirrors. It passes through an aperture 121 in fold mirror 122 and then through an aperture 117 in primary mirror 116. It then strikes tertiary mirror 124 aft of the primary mirror 116. The light is reflected back to fold mirror 122 which reflects it along pitch axis 36 to plane mirror 26. Plane mirrors 26, 28, and 30 direct the light out of the system through the exit aperture 32 along roll axis 38 to detection apparatus 34.

As in the previous embodiment, the embodiment shown in FIG. 4 is rotated by similar means about the pitch axis 36 and the roll axis 38. This rotation about axes through internal system points provides for smaller swept volumes and larger scanning angles.

Figure 5:
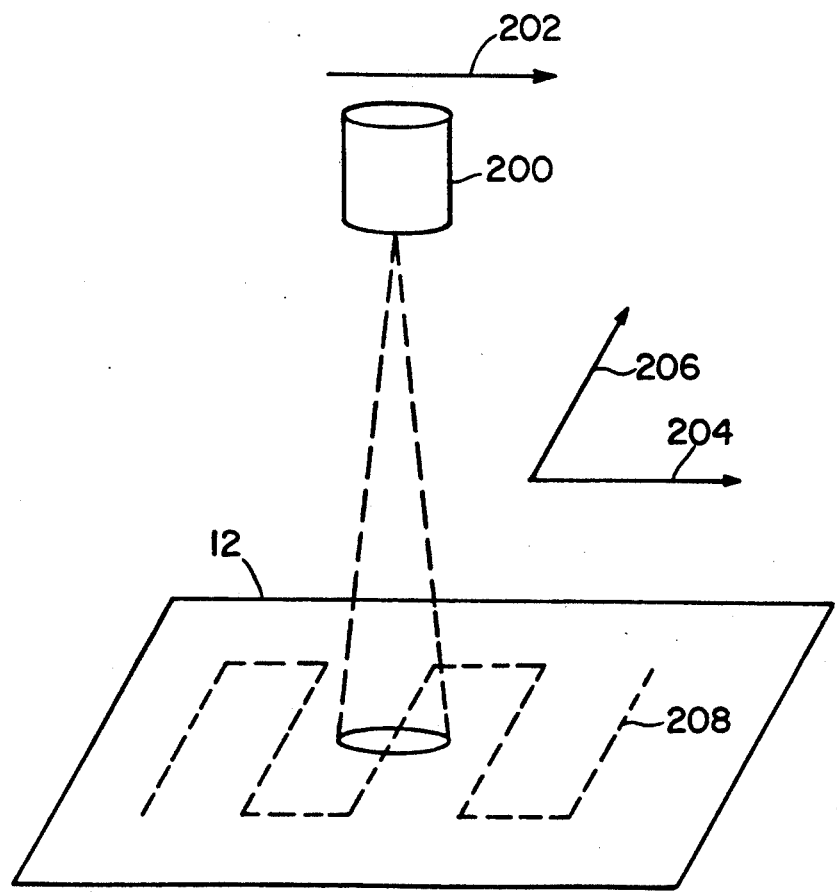
FIG. 5 is a schematic view of an airborn system containing the scanning system of the present invention.

FIG. 5 schematically depicts an airborn system 200 containing the reflective scanning system 10 of the present invention. The airborn system 200 passes over the scene 12 in the direction indicated by arrow 202. As the system 200 moves over the scene 12, it is rotated in both directions indicated by arrows 204 and 206. As a result, the system 200 collects light from the scene 12 along the path 208. Thus, the entire scene 12 is scanned by rotating the scanning system 10 along two axes as it moves by.

While this invention has been particularly shown and described with references to preferred embodiments thereof, it will be understood by those skilled in the art that various changes in form and details may be made therein without departing from the spirit and scope of the invention as defined by the appended claims.

I claim:

1. A scanning optical system having a plurality of mirrors for directing light along an optical path, said optical system comprising:

an entrance aperture for admitting light into the system;

an exit aperture through which light exits the system;

a pitch axis and a roll axis about which the optical system is rotatable;

a primary mirror for reflecting the light entering the system through the entrance aperture;

a secondary mirror for receiving the light reflected by the primary mirror and reflecting the light toward a focus between the primary mirror and the secondary mirror;

a tertiary mirror for reflecting the light along the optical path;

a fold mirror between the primary mirror and the secondary mirror for reflecting the light along the pitch axis and coupling the light to the exit aperture;

a pitch actuator for rotating the system about the pitch axis; and a roll actuator for rotating the system about the roll axis.

2. The optical system of claim 1 further comprising an optical axis running through at least the entrance aperture, the primary mirror, the focus, the secondary mirror and the tertiary mirror.

3. The optical system of claim 1 wherein the tertiary mirror reflects light along the pitch axis.

4. The optical system of claim 1 wherein the roll axis runs through the exit aperture.

5. The optical system of claim 1 wherein the fold mirror is located approximately at the geometric center of a volume occupied by the system.

6. The optical system of claim 1 wherein the pitch axis and the roll axis intersect at approximately the geometric center of a volume occupied by the system.

7. The optical system of claim 1 wherein the fold mirror is located approximately at an intersection of the pitch axis and the roll axis.

8. The optical system of claim 1 wherein the pitch axis runs through a point located approximately at the geometric center of a volume occupied by the system.

9. The optical system of claim 1 further comprising an exit pupil accessible for coupling optical correction devices to the exit pupil.

10. A method of scanning a scene with an optical system to create an image of the scene comprising:

allowing light from the scene to enter the system through an entrance aperture along an optical axis of the system, to follow an optical path through the system, and to exit the system through an exit aperture;

reflecting the light entering through the entrance aperture from a primary mirror to a secondary mirror and from the secondary mirror toward a focus between the primary mirror and the secondary mirror;

reflecting the light along the optical path with a tertiary mirror;

reflecting the light along a pitch axis of the system with a fold mirror located between the primary mirror and the secondary mirror;

coupling the light to the exit aperture; and rotating the system about the pitch axis and a roll axis to scan the scene.

11. The method of claim 10 further comprising locating the tertiary mirror along said optical axis of the system, said optical axis running through at least the primary mirror, the secondary mirror, and the focus.

12. The method of claim 10 further comprising locating the tertiary mirror along the pitch axis.

13. The method of claim 10 further comprising allowing the light to exit the system through the exit aperture along the roll axis.

14. The method of claim 10 wherein the rotating step comprises rotating the system about a point approximately at the geometric center of a volume occupied by the system.

15. The method of claim 10 further comprising locating the fold mirror approximately at the geometric center of a volume occupied by the system.

16. The method of claim 10 further comprising orienting the pitch axis and the roll axis to intersect approximately at the geometric center of a volume occupied by the system.

17. The method of claim 10 further comprising locating the fold mirror approximately at an intersection of the pitch axis and the roll axis.

18. The method of claim 10 further comprising orienting the pitch axis through a point located approximately at the geometric center of a volume occupied by the system.

* * * * *